(12) United States Patent
Kinoshita

(10) Patent No.: US 7,748,435 B2
(45) Date of Patent: Jul. 6, 2010

(54) TEMPERATURE REGULATOR

(75) Inventor: Atsushi Kinoshita, Hiratsuka (JP)

(73) Assignee: Kelk Ltd., Kanagawa (JP)

( * ) Notice: Subject to any disclaimer, the term of this patent is extended or adjusted under 35 U.S.C. 154(b) by 1047 days.

(21) Appl. No.: 11/192,017

(22) Filed: Jul. 29, 2005

(65) Prior Publication Data

US 2006/0175051 A1 Aug. 10, 2006

(30) Foreign Application Priority Data

Dec. 28, 2004 (JP) ............................. 2004-379185

(51) Int. Cl.
*G05D 23/00* (2006.01)
(52) U.S. Cl. ........................... 165/47; 165/11.1; 165/76; 165/108; 165/104.31; 165/253; 312/236; 62/298; 62/302
(58) Field of Classification Search ............... 165/11.1, 165/253, 47, 76, 108, 104.31; 312/236; 62/298, 62/302
See application file for complete search history.

(56) References Cited

U.S. PATENT DOCUMENTS 3,323,625 A * 6/1967 Webster ....................... 62/302
3,712,078 A * 1/1973 Maynard et al. ............... 62/298
6,000,458 A * 12/1999 Watanabe ................... 165/11.1

FOREIGN PATENT DOCUMENTS

| EP | 762819 A1 * | 3/1997 |
| JP | 8-191167 | 7/1996 |
| JP | 9-186379 | 7/1997 |
| KR | 1998-65034 | 10/1998 |

OTHER PUBLICATIONS

Refusing Reason Notice (with English translation) issued Jan. 12, 2010 in corresponding Japanese Patent Application No. 2004-379185,

* cited by examiner

*Primary Examiner*—John K Ford
(74) *Attorney, Agent, or Firm*—Wenderoth, Lind & Ponack, L.L.P.

(57) ABSTRACT

A temperature regulator having a heat exchange unit and a power supply and control unit and providing a heat-exchange apparatus, which can be installed in a minimal space and yet is very easy to handle. The temperature regulator includes a heat exchange unit which has a tank, a pump and a heat exchanger, and circulates a liquid to exchange heat with circulating liquid, and a power supply and control unit which has a power supply and control device, and controls temperature of the circulating liquid. The heat exchange unit and the power supply and control unit are arranged in an interior of a main frame.

5 Claims, 5 Drawing Sheets

TEMPERATURE REGULATOR

BACKGROUND OF THE INVENTION

1. Field of the Invention

The present invention relates to a temperature regulator which comprises a heat exchange unit and a power supply and control unit, and regulates temperature of circulating liquid.

2. Description of the Related Art

In the manufacturing field of semiconductor devices, for example, a temperature regulator having a heat exchange unit and a power supply and control unit is adopted in a variety of production processes for the purpose of temperature management.

FIG. 5 shows a conventional temperature regulator A which is provided in a plasma etching device E to regulate temperature of a susceptor (support table) S for supporting a wafer W. This temperature regulator A is composed of a heat exchange unit B having a tank T, a pump P and a heat exchanger H, and of a power supply and control unit C having a power supply unit V, a controller U and an operation panel I.

The heat exchange unit B of the temperature regulator A circulates liquid through the susceptor S and exchanges heat with the circulating liquid at the heat exchanger H. The power supply and control unit C of the temperature regulator A controls operation of the pump P and the heat exchanger H of the heat exchange unit B to regulate the temperature of the circulating liquid, thereby to perform substantial temperature regulation of the susceptor S.

In the conventional temperature regulator A, however, the heat exchange unit B and the power supply and control unit C are separate and independent components, which poses a problem that a large space is required for installation thereof.

Moreover, in the installation of the temperature regulator A, the heat exchange unit B and the power supply and control unit C must be handled separately, and cables connecting the heat exchange unit B and the power supply and control unit C must also be handled. This makes it very complicated to handle the temperature regulator A.

In view of the circumstances as described above, it is an object of the present invention to provide a heat-exchange apparatus which can be installed in a minimal space and yet can be handled very easily.

SUMMARY OF THE INVENTION

In order to achieve the object above, a temperature regulator according to a first aspect of the invention includes a heat exchange unit which has a tank, a pump and a heat exchanger, and exchanges heat with circulating liquid while circulating the same, and a power supply and control unit having a power supply and control means for controlling temperature of the circulating liquid, and is characterized in that the heat exchange unit and the power supply and control unit are arranged in the interior of a main frame.

According to the configuration above, the heat exchange unit and the power supply and control unit are arranged in the interior of the main frame, which makes it possible to reduce the space required for installation of the temperature regulator in comparison with the conventional temperature regulator in which the heat exchange unit and the power supply and control unit are provided as separate components.

Additionally, according to the configuration above, the arrangement of the heat exchange unit and the power supply and control unit in the interior of the main frame makes it possible to handle the heat exchange unit and the power supply and control unit as a whole. Further, the cable connecting between the heat exchange unit and the power supply and control unit is also arranged in the interior of the main frame, which makes it even easier to handle the temperature regulator.

A temperature regulator according to a second aspect of the invention relates to the temperature regulator according to the first aspect and is characterized in that a part of a column of the main frame, which will interfere with piping of the heat exchange unit during attachment and detachment of the heat exchange unit to and from the main frame, is made removable.

According to the configuration above, the attachment or detachment of the heat exchange unit to or from the main frame can be carried out smoothly without the main frame being interfered with the piping of the heat exchange unit by previously removing the part of the column of the main frame.

A temperature regulator according to a third aspect of the invention relates to the temperature regulator of the second aspect and is characterized in that the tank, the pump, and the heat exchanger in the heat exchange unit are assembled together to form an integral unit.

According to the configuration above, the tank, the pump, and the heat exchanger of the heat exchange unit are integrated into one unit, which makes it possible to smoothly attach or detach the heat exchange unit to or from the main frame.

A temperature regulator according to a fourth aspect of the invention relates to the temperature regulator of the third aspect and is characterized in that the integral unit is fixedly arranged on a tray which is detachably arranged in the main frame.

According to the configuration above, the integral unit is fixedly arranged on the tray which is detachably arranged in the main frame, which makes it possible to smoothly attach or detach the heat exchange unit to or from the main frame.

DETAILED DESCRIPTION OF THE INVENTION

The present invention will now be described in detail with reference to the drawings showing an embodiment.

FIG. 1 to FIG. 4 show an example in which the present invention is applied to a temperature regulator for regulating temperature of an etching apparatus (susceptor) in a semiconductor device manufacturing process.

Figure 1:
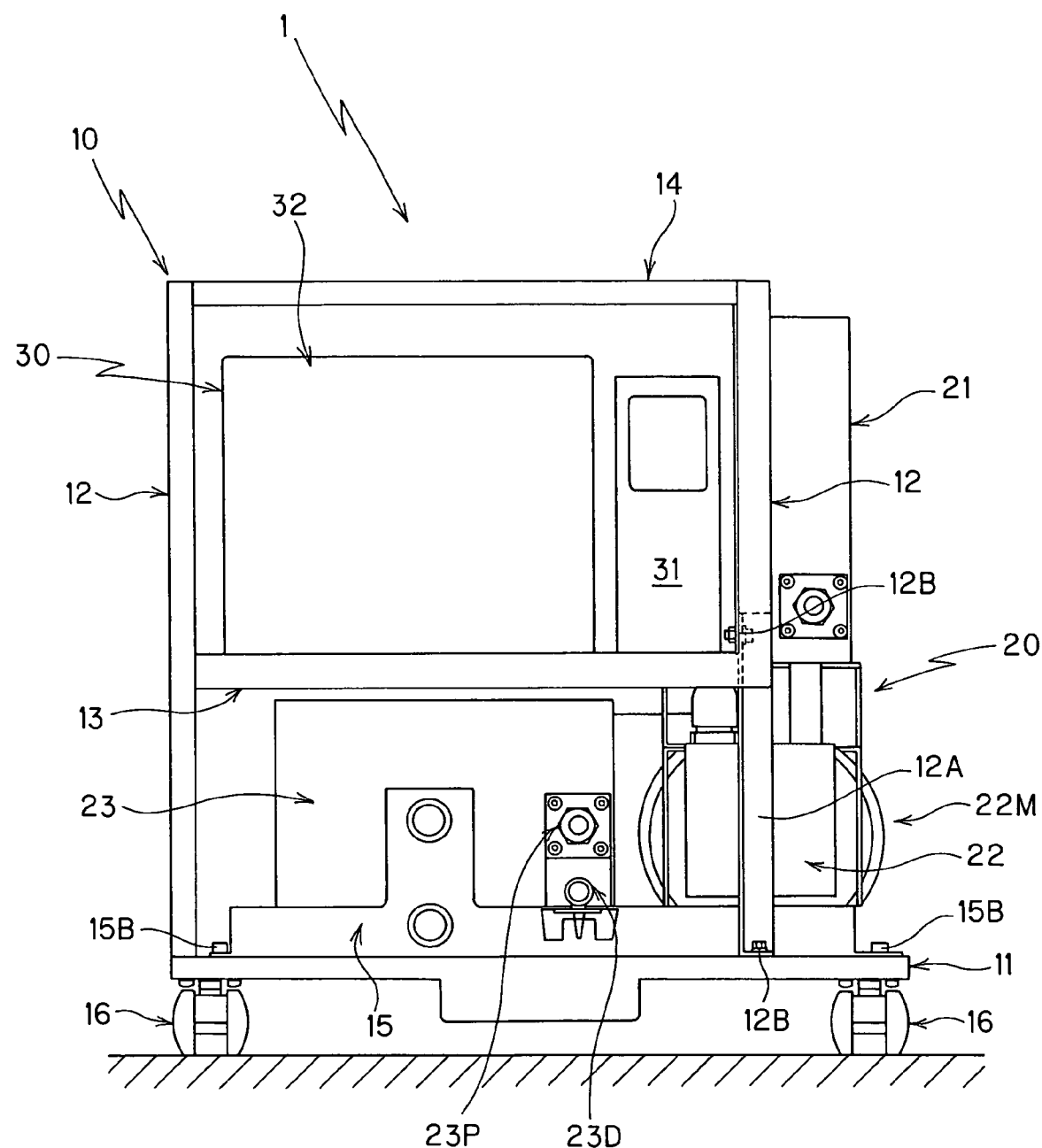
FIG. 1 is a front view illustrating a temperature regulator according to an embodiment of the present invention.
Figure 2:
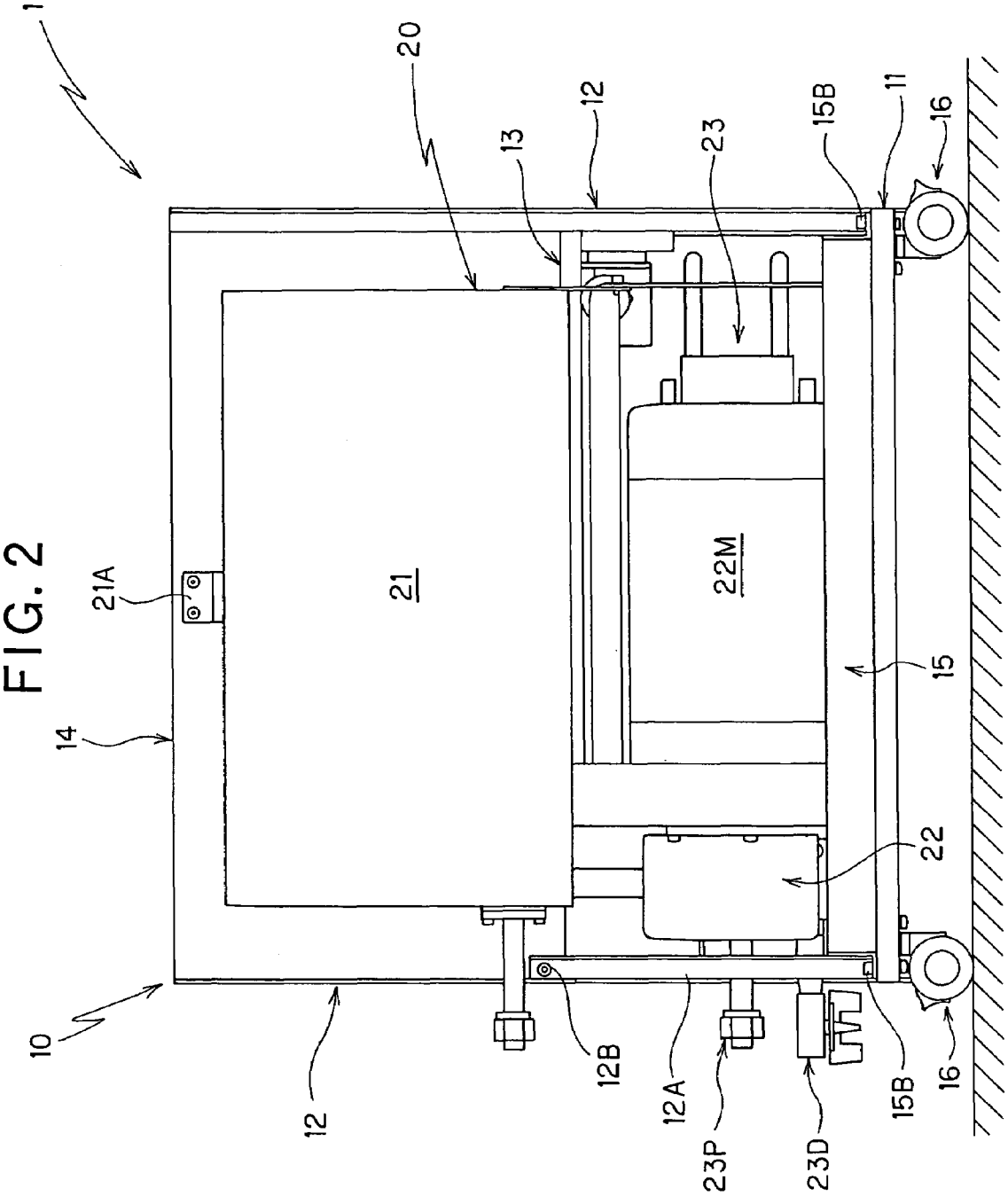
FIG. 2 is a side view illustrating the temperature regulator according to the embodiment of the present invention.
Figure 3:
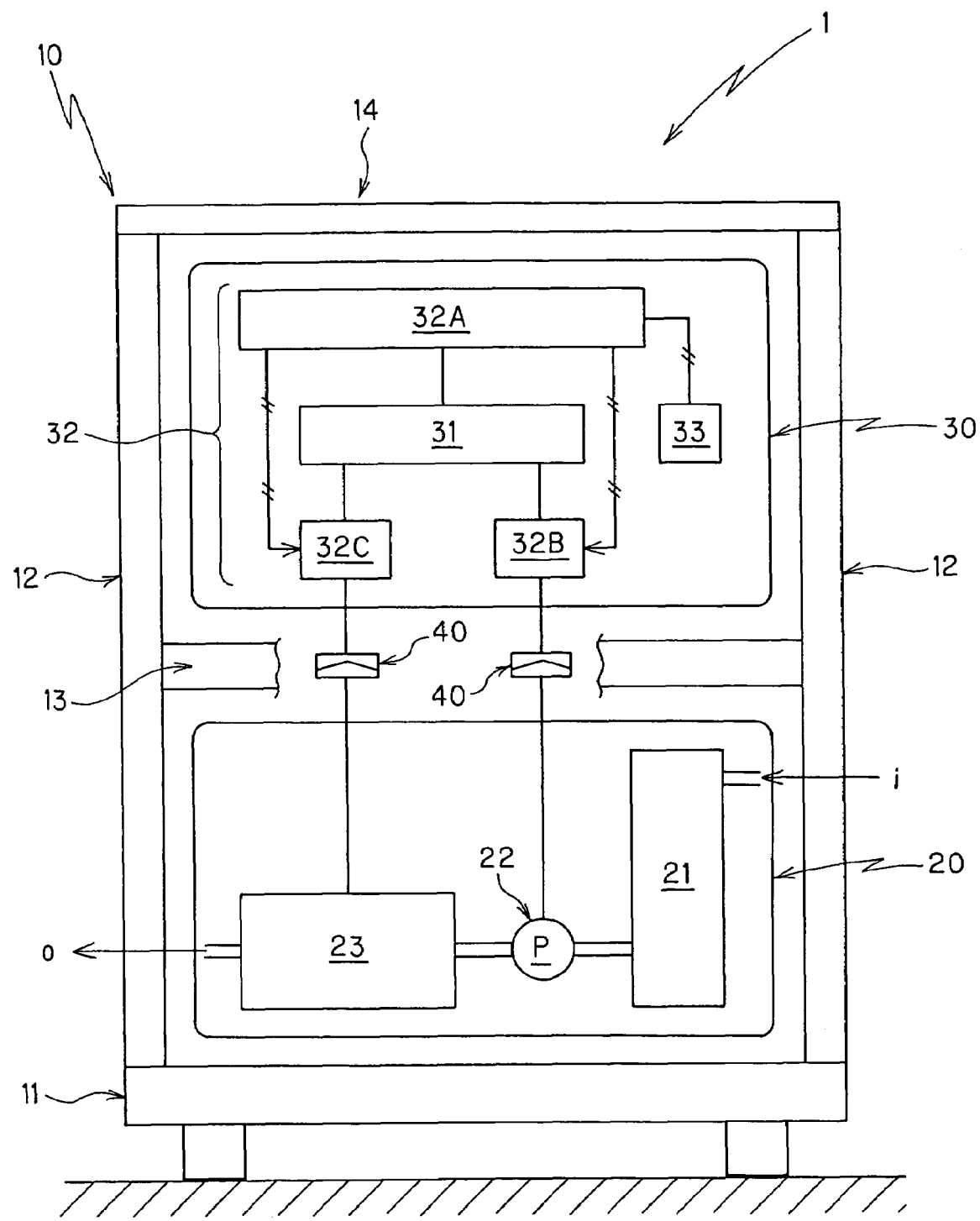
FIG. 3 is a schematic view illustrating the temperature regulator according to the embodiment of the present invention.

As shown in FIG. 1 to FIG. 3, a temperature regulator 1 according to the present embodiment includes a main frame 10 of a lattice structure formed by assembling beams and columns, and a heat exchange unit 20 and a power supply and control unit 30 which are arranged in the interior of the main frame 10.

The main frame 10 includes a base frame 11 having a rectangular shape and extending horizontally, and four vertical columns 12 extending vertically from the base frame 11. The main frame 10 further includes an intermediate frame 13 which extends horizontally above the base frame 11, and an upper frame 14 which extends horizontally above the intermediate frame 13.

A caster 16 is provided at each of the bottom corners of the base frame 11 of the main frame 10, whereby the main frame 10 is enabled to move on the floor (floor surface) easily.

The heat exchange unit 20 includes a tank 21 for storing liquid, a pump 22 and drive motor 22M, and a heat exchanger 23. The heat exchange unit 20 circulates circulating liquid to and from a susceptor (see FIG. 5), while exchanging heat with the circulating liquid at the heat exchanger 23. The circulating liquid is introduced into the tank 21 as indicated by the arrow i (FIG. 3) and pumped out from the heat exchanger 23 as indicated by the arrow o (FIG. 3) by the operation of the pump 22.

The tank 21, the pump 22 and drive motor 22M, the heat exchanger 23, and so on are assembled together by means of joints and connection piping (not shown) to form an integral unit. This integral unit is fixedly arranged on the top of the tray 15 attached to the base frame 11 of the main frame 10.

The heat exchanger 23 of the heat exchange unit 20 according to the embodiment uses a thermoelectric element such as a Peltier element as heating means for exchanging heat with the circulating liquid such as Fluorinert. Instead, it is of course possible to adopt a heat exchanger using a lamp heater or the like as heating means.

Figure 5:
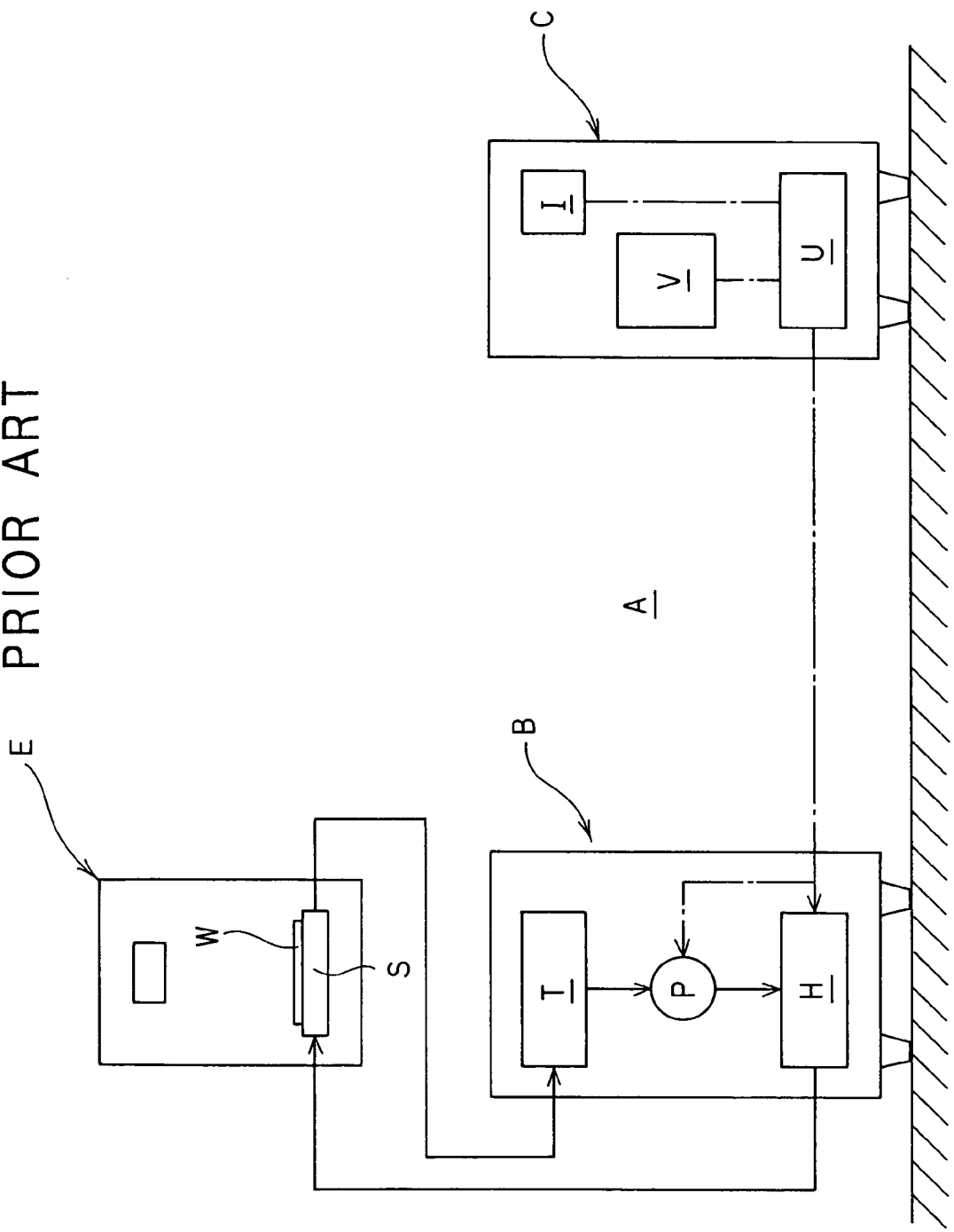
FIG. 5 is a schematic view illustrating a conventional temperature regulator adopted in a manufacturing process of semiconductor devices.

The power supply and control unit 30, which includes a power supply unit (power supply) 31, and a control unit (control means) 32, controls operation of the pump 22 (drive motor 22M) and the heat exchanger 23 of the heat exchange unit 20 to regulate the temperature of the circulating liquid and to thereby regulate the temperature of the susceptor (see FIG. 5). The power supply unit 31 and the control unit 32 are fixedly arranged on the top of the intermediate frame 13 of the main frame 10.

As shown in FIG. 3, the power supply and control unit 30 has an operation panel 33, while the control unit 32 has a CPU (Central Processing Unit) 32A, and inverter 32B which controls operation of the pump 22 (drive motor 22M) of the heat exchange unit 20 according to a command of the CPU 32A, and a control board 32C which control temperature of the heat exchanger 23. The inverter 32B is connected to the pump 22 (drive motor 22M) by means of a cable having a connector 40 inserted therein, and the control board 32C is connected to the heat exchanger 23 also by means of a cable having a connector 40 inserted therein.

As described above, in the temperature regulator 1 according to the embodiment, the heat exchange unit 20 and the power supply and control unit 30 are both arranged in the interior of the main frame 10. Accordingly, the installation space can be reduced significantly in comparison with the conventional temperature regulator in which the heat exchange unit and the power supply and control unit are separate components (see FIG. 5).

Further, in the temperature regulator 1 according to the embodiment, the heat exchange unit 20 and the power supply and control unit 30 are arranged in the interior of the main frame 10 in a stacked condition. As a result, the projection area (floor area) can be minimized, and thus the space required for the installation of the temperature regulator 1 can be reduced significantly.

The arrangement of the heat exchange unit 20 and the power supply and control unit 30 in the interior of the main frame 10 makes it possible to handle them as a whole. Further, the handling of the temperature regulator 1 is made even easier by also arranging the cable connecting between the heat exchange unit 20 and the power supply and control unit 30 in the interior of the main frame 10.

Figure 4:
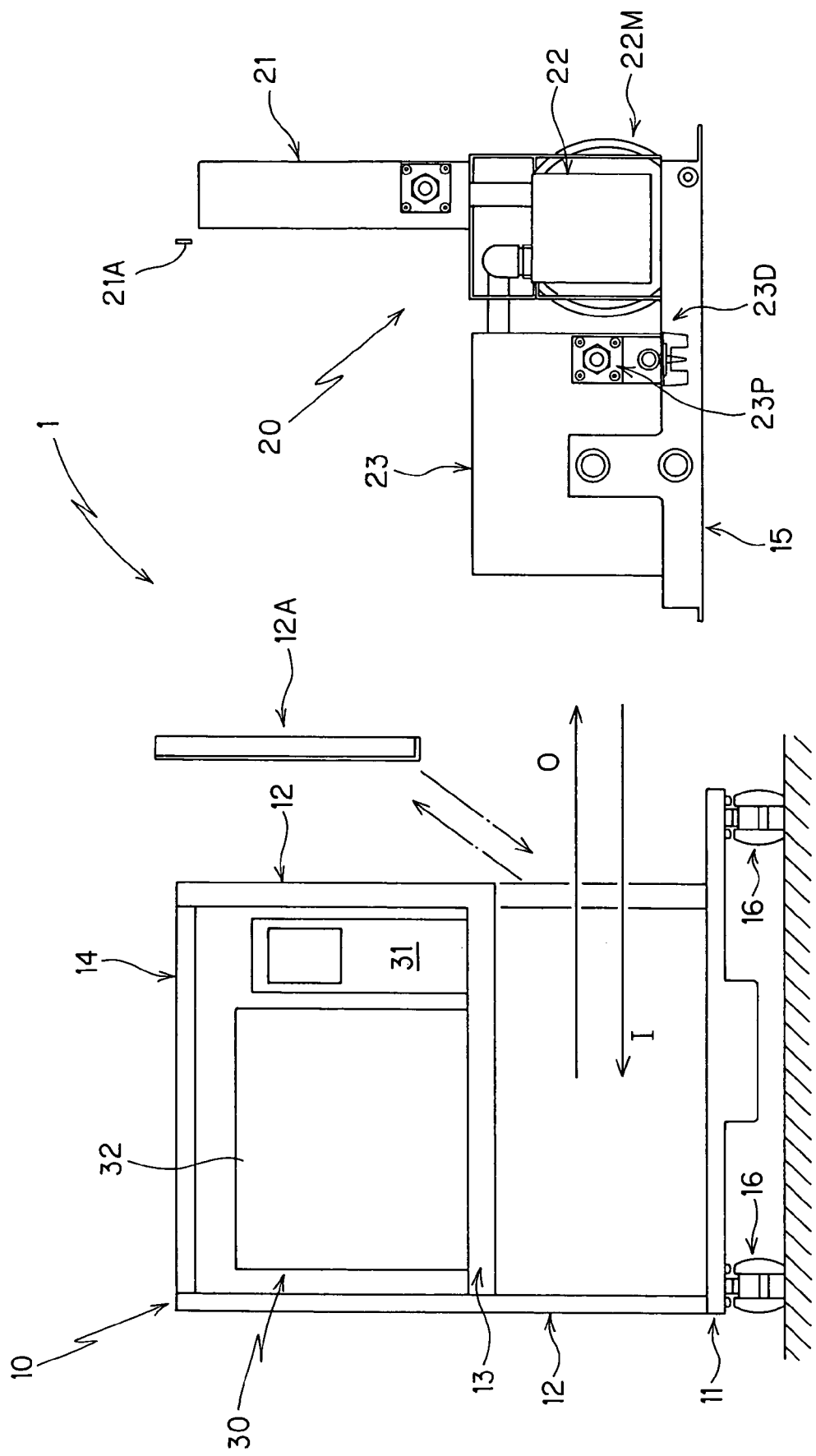
FIG. 4 is a front view illustrating a condition of the temperature regulator according to the embodiment of the present invention, in which the heat exchange unit is pulled out from the main frame.

As shown in FIGS. 1, 2 and 4, the tray 15, on which the integral unit formed by assembling the tank 21 and the pump 22 (drive motor 22M) of the heat exchange unit 20 and the heat exchanger 23 is fixedly arranged, is detachably attached to the base frame 11 of the main frame 10 at the four corners thereof by means of the bolts 15B. The top part of the tank 21 is detachably bolted to an upper part of the main frame 10 by means of a bracket 21A.

One of the vertical columns 12 of the main frame 10, more specifically, the vertical column 12 located on the front right side of the main frame 10 has a removable column portion 12A in a lower part thereof. This removable column portion 12A is detachably attached to the main frame 10, more specifically to the top of the base frame 11 and to the front right side corner of the intermediate frame 13, by means of the upper and lower bolts 12B.

In the temperature regulator 1 constructed as described above, the removable column portion 12A is removed first from the main frame 10, as shown in FIG. 4, when maintenance is performed on the heat exchange unit 20 which has a lot of parts and components with a short maintenance span such as the thermoelectric element in the heat exchanger and O-rings in the connection piping.

Subsequently, the tray 15 is removed from the base frame 11 of the main frame 10. The bolt fixing the top of the tank 21 is also detached. The integral unit having the tank 21, the pump 22 (drive motor 22M) and the heat exchanger 23 assembled together is pulled out sideways, together with the tray 15, from the main frame 10 as indicated by the arrow O in FIG. 4.

The heat exchange unit 20 can thus be pulled out and exposed, so that the maintenance on the heat exchange unit 20 can be performed very easily without obstruction from the main frame 10 which normally covers the heat exchange unit 20.

There are provided, in front of the heat exchanger 23 in the heat exchange unit 20, a pipe head 23P, a drain valve 23D and so on. The pipe head 23P and the drain valve 23D project significantly from the main frame 10 in the condition where the heat exchange unit 20 is arranged inside of the main frame 10, and therefore might interfere with the vertical column 12, more specifically the lower part of the vertical columns 12 located on the front right side of the main frame 10 during attachment or detachment of the heat exchange unit 20 to or from the main frame 10. In order to avoid this, the removable column portion 12A is provided in the lower part of the vertical column 12 so that the heat exchange unit 20 can be pulled out of the main frame 10 easily by removing the removable column portion 12A from the main frame 10.

Further, the removal of the removable column portion 12A makes it possible to pull the heat exchange unit 20 out of the main frame 10 without removing from the heat exchanger 23 the parts such as the pipe head 23P projecting from the main frame 10. Additionally, after completion of the maintenance work as well, the heat exchange unit 20 can be pushed into the main frame 10 without removing the pipe head 23P or the like. This saves the complicated work involving the attachment or detachment of the pipe head 23P and the like to or from the heat exchanger 23, and also saves a leak test which is otherwise required after reattachment of the pipe head 23P and the like. As a result, the maintenance on the heat exchange unit 20 is made far easier.

According to the configuration of the temperature regulator 1 described above, the integral unit composed of the assembly of the tank 21, the pump 22 (drive motor 22M), and the heat exchanger 23 in the heat exchange unit 20 is pulled out of the main frame 10 together with the tray 15. This means that the heat exchange unit 20 can be pulled out of and pushed into the main frame 10 without deconstructing the heat exchange unit 20. Therefore, not only the maintenance on the heat exchange unit 20 but also assembly thereof during the manufacture can be performed very easily.

As shown in FIG. 4, after the maintenance is completed on the heat exchange unit 20 which has been pulled out of the main frame 10, the integral unit composed of the assembly of the tank 21, the pump 22 (drive motor 22M) and the heat exchanger 23 forming the heat exchange unit 20 is pushed into the main frame 10 together with the tray 15 as indicated by the arrow I of FIG. 4.

Subsequently, the tray 15 is fixed to the base frame 11 of the main frame 10 by means of the bolts 15B, and the top of the tank 21 is bolted to the main frame 10. The removable column portion 12A is also fixed to the main frame 10 by means of the bolts 12B. Thus, the temperature regulator 1 is restored to its original operable state.

During manufacture of the temperature regulator 1 as well, the heat exchange unit 20 which has been assembled is pushed into the main frame 10 as described above, and thereafter the removable column portion 12A is fixed to the main frame 10 to complete the temperature regulator 1 as a product.

It will be obvious to those skilled in the art that the connector 40 (see FIG. 3) of the cable connecting between the heat exchange unit 20 and the power supply and control unit 30 is separated when the heat exchange unit 20 is detached from the main frame 10, and the connector 40 is joined when the main frame 10 is attached to the heat exchange unit 20.

The above description of the embodiment has been made of a case in which the temperature regulator according to the present invention is applied to regulate the temperature of the susceptor in the plasma etching device adopted in the semiconductor device manufacturing process. However, it is obvious that the temperature regulator of the present invention is also effectively applicable to temperature management in a variety of other manufacturing processes.

Additionally, the above description of the embodiment has been made of a case in which the present invention is applied to the manufacturing field of semiconductor devices. However, it is obvious that the temperature regulator of the present invention is also effectively applicable to equipment in a variety of other industrial fields requiring accurate temperature regulation.

What is claimed is:

1. A temperature regulator comprising:
    a main frame including a frame base, and a plurality of columns extending vertically from the frame base;
    a heat exchange unit mounted in the main frame, the heat exchange unit having a tank, a pump and a heat exchanger,
    the heat exchange unit being operable to circulate a liquid to exchange heat with circulating liquid;
    a power supply and control unit arranged in the interior of the main frame, the power supply and control unit having a power supply and control means,
    the power supply and control unit being operable to control temperature of the circulating liquid,
    wherein the heat exchange unit includes piping that projects outwardly of the main frame, and at least one of the columns has a removable column portion for permitting removal of the heat exchange unit from the main frame; and
    a tray removably attached to the frame base, wherein the heat exchange unit is fixedly arranged on the tray so that, upon removal of the removable column portion, the tray and the heat exchange unit can be pulled from the main frame without the column interfering with a pipe head of the heat exchange unit.

2. The temperature regulator according to claim 1, wherein the tank, the pump and the heat exchanger in the heat exchange unit are assembled together to form an integral unit.

3. The temperature regulator according to claim 2, wherein the integral unit is fixedly arranged on a tray which is detachably arranged in the main frame.

4. The temperature regulator according to claim 1, wherein the main frame comprises an upper frame member and an intermediate frame member supporting the power supply and control unit.

5. The temperature regulator according to claim 1, wherein the removable column portion is only a lower portion of the column so that only the lower portion of the column is removable.

* * * * *